United States Patent
Valdez et al.

(10) Patent No.: US 8,457,592 B2
(45) Date of Patent: Jun. 4, 2013

(54) CONFIGURABLE COMMUNICATIONS DEVICE

(75) Inventors: John Valdez, Flower Mound, TX (US); Nooruddin T. Esmail, Carrollton, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1173 days.

(21) Appl. No.: 12/113,622

(22) Filed: May 1, 2008

(65) Prior Publication Data

US 2009/0275308 A1 Nov. 5, 2009

(51) Int. Cl.
*H04B 7/00* (2006.01)
*H04M 11/00* (2006.01)

(52) U.S. Cl.
USPC .......................................... 455/405; 455/69

(58) Field of Classification Search
USPC .................. 455/456.1–456.6, 518, 416, 405, 455/69, 561, 417, 419; 369/47.36; 704/226; 700/90; 709/204; 379/202.01
See application file for complete search history.

(56) References Cited

U.S. PATENT DOCUMENTS

| | | | |
|---|---|---|---|
| 7,603,130 B2 * | 10/2009 | Anantha | 455/456.3 |
| 7,603,131 B2 * | 10/2009 | Wang et al. | 455/456.3 |
| 8,150,416 B2 * | 4/2012 | Ribaudo et al. | 455/456.1 |
| 2002/0035404 A1 * | 3/2002 | Ficco et al. | 700/65 |
| 2002/0107008 A1 * | 8/2002 | Hendrey et al. | 455/416 |
| 2003/0104820 A1 * | 6/2003 | Greene et al. | 455/456 |
| 2005/0026661 A1 * | 2/2005 | Rheenen et al. | 455/575.8 |
| 2005/0064860 A1 * | 3/2005 | DeLine | 455/420 |
| 2005/0271864 A1 * | 12/2005 | van Driesten et al. | 428/195.1 |
| 2006/0123360 A1 * | 6/2006 | Anwar et al. | 715/810 |
| 2007/0183407 A1 * | 8/2007 | Bennett et al. | 370/352 |
| 2008/0045179 A1 * | 2/2008 | Bekanich et al. | 455/405 |
| 2008/0101576 A1 * | 5/2008 | Vernick | 379/202.01 |
| 2008/0270302 A1 * | 10/2008 | Beenau et al. | 705/42 |
| 2009/0251285 A1 * | 10/2009 | Do et al. | 340/5.74 |

* cited by examiner

*Primary Examiner* — Melody Mehrpour (57) ABSTRACT

A communications device is configured to receive an input from a user device when the communications device is positioned proximate the user device. The user device includes a data store having at least an identifier. The communications device is configured to adjust at least one operational setting within the communications device upon receiving the input.

25 Claims, 5 Drawing Sheets

CONFIGURABLE COMMUNICATIONS DEVICE

BACKGROUND

As communications devices, such landline and mobile phones, internet calling mechanisms, personal digital assistants and the like become more ubiquitous, it is becoming increasingly desirable to allow individualized customization of communications devices by users. Such personalization can be beneficial, for example, in allowing many functions to be tailored to specific users, to allow users to express themselves through their unique communications device, or to allow multiple users to use one communications device in highly personalized ways.

Current approaches to operational personalization require that a user, for example, manually change various settings within a communications device, download desired ring tones, manually change wallpaper, etc. Another way of personalizing a communications device includes the use of distinct faceplates that can be easily added to, removed from, or swapped between communications devices. Current faceplates, however, generally serve a purely aesthetic purpose, decorating the exterior of a communications device, but do not facilitate operational personalization of settings within a communications device.

Moreover some communications devices, such as home telephones, generally do not provide any but the most minimal mechanisms for personalization, such as changing a ring type or volume, or swapping different colored faceplates. Accordingly, current approaches do not allow a user to quickly and easily change device settings, including both operational personalization and external aesthetics.

DETAILED DESCRIPTION

The following detailed description includes illustrations of exemplary approaches. A communications device is configured to receive an input from a user device when the communications device and the user device are brought near each other. The user device includes a data store, such as internal memory, capable of storing data. Among the data stored on the user device is an identifier. The communications device is configured to adjust at least one internal operational setting upon receiving the input.

As described more fully below, by way of example and not limitation, the communications device may be a telephone, such as an internet phone, a landline phone or a mobile phone, a personal computing device or a personal digital assistant, which may communicate over a wireless protocol.

The user device may include additional physical components including, but not limited to, a faceplate which may be easily placed on and removed from a communications device, a wand which may be held near a communications device, as well as a card, a chip, solid state memory, etc. The user device may be configured to transmit data using a wired or a wireless connection. In one exemplary approach, a user device may include a radio frequency identifier (RFID) chip, which may wirelessly transmit data to an RFID reader when placed in proximity to the reader. Such an RFID chip is an example of an unpowered user device, relying on a reader to provide the energy to interact with data on the chip. In another exemplary approach, a user device may include an infrared device, which may wirelessly communicate data with a communications device using an associated infrared device. In still another exemplary approach, a user device may include a universal serial bus (USB) connection configured to transmit data to a communications device upon connection to the communications device. In a further exemplary approach, the user device may include a bar code which may be read by a corresponding bar code reader.

Operational settings adjusted by the communications device may include, for example, personality-based settings of the communications device and/or service-based settings of the communications device. Personality-based settings may include, for example, ring tones, wallpaper graphics, etc., as well as external device aesthetics, such as graphics, textures, contours etc., which may be included, for example, on a removable faceplate. Service-based settings may include, by way of example and not of limitation, how phone services are billed, which services are made available to a particular user, times or durations during which services are made available to a user, etc.

In one exemplary approach, operational settings may be determined from the received identifier itself. In another approach, the received identifier may provide direction as to a location, such as a database, a server, or other data store where information or data related to operational settings may be retrieved. For example, a received identifier may point to a data store where service-based and/or personality-based settings or media are stored. Such a data store may be internal to the communications device, such as in random access memory (RAM) or an internal hard drive, or such a data store may be located remotely to the communications device, in which case the communications device may use the received identifier to locate operational setting information. In one approach, a communications device may use an identifier to identify a particular user account stored on a network. In such a case, the communications device may access the identified account to determine which operational settings to adjust. In another exemplary approach, the communications device may use the received identifier to identify particular media content, and/or a particular location, such as a database, server, data store, etc. from which media content may be retrieved. In such a case, the communications device may then retrieve media content, such as a ringtone, wallpaper graphics, video, etc. for display on the communications device. Additional exemplary approaches will be explained below.

Figure 1:
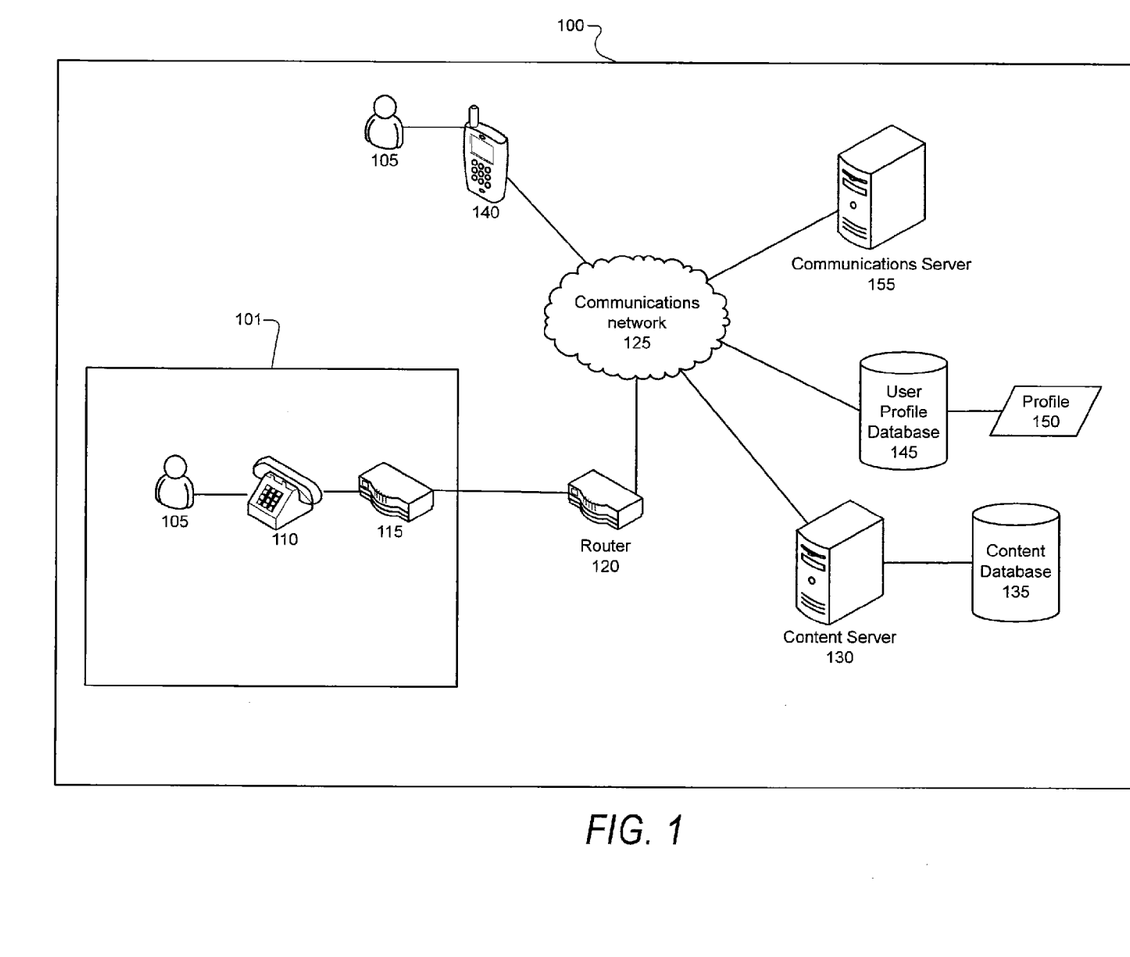
FIG. 1 illustrates an exemplary communications network.

FIG. 1 illustrates an exemplary communications network 100 through which a user 105 may selectively interact with a communications device, such as a telephone 110, a mobile phone 140, etc. In one illustrative approach a communications device, which may be a telephone 110 using the voice over internet protocol (VOIP), such as an internet phone, is in selective communication with a broadband home router (BHR) 115. In the exemplary illustration telephone 110 is located within a customer premises 101. For example, BHR 115 may be a broadband home router or wireless broadband home router from Actiontec Electronics, Inc. of Sunnyvale, Calif. BHR 115 may also provide a wired or wireless local area network (LAN), thereby providing selective communications between various devices within customer premises 101. Telephone 110 may communicate with BHR 115 over a wired or a wireless connection, as is known. Telephone 110 may use BHR 115 to send information to, and receive information from, a communications network 125. BHR 115 may access communications network 125 through a gateway router 120, as illustrated, or may access a network such as communications network 125 directly. Additionally, a communications device such as telephone 110 may access a network such as communications network 125 directly.

When using a telephone 110 of the type described, communications network 125 includes the capability to handle packets. Further, communications network 125 may utilize the internet protocol (IP), the user datagram protocol (UDP), transmission control protocol (TCP), hypertext transfer protocol (HTTP), etc. Further, network 125 may include a variety of networks such as a wide area network (WAN), e.g., the internet, a local area network (LAN), etc. As is known, packet switched network 125 may be used to transport a variety of data, including multimedia data, such as audio and video.

In the exemplary illustration, communications server 155 is generally configured to facilitate transfers of data between various computing devices including telephone 110, mobile phone 140, content server 130, and user profile database 145 over communications network 125. Data transfers can include, for example, transfer of voice communications between communications devices such as telephone 110 and mobile phone 140, and transfers of media between a server, such as content server 130, and a communications device such as telephone 110 and mobile phone 140.

A network, such as communications network 125, may include a profile database 145 which may store profiles 150. A profile 150 may be associated with one or more entities, such as a user 105, a communications device such as telephone 110 or mobile phone 140, etc. A profile 150 may be associated in database 145 with an entity through, for example an identifier which may be a user identifier associated with a particular user 105, a device identifier associated with a particular communications device such as telephone 110 or mobile phone 140, etc.

A profile 150 may include, for example, service-based account information relating to a particular user 105 or to a particular communications device such as telephone 110 or mobile phone 140. Such service-based account information may include, by way of example and not of limitation, a list of services available to a user 105, such as local calling, long distance calling, text messaging, as well as data services such as internet downloads, ring tone downloads and wallpaper downloads. Account information may also include billing information for an associated user 105, as well as service indicators, such as the allowable number of minutes allotted to an associated user 105, particular times of the day when an associated user 105 is permitted to use services, specific phone numbers which a user 105 is permitted or prohibited to call, etc. Profile 150 may also include personalization-based operational settings, such as particular ringtones, wallpapers, etc. for an associated user 105 or communications device, such as telephone 110 or mobile phone 140.

A communications device, such as telephone 110 and mobile phone 140, may communicate with a database, such as profile database 145, through a network such as communications network 125.

The illustrated exemplary approach of FIG. 1 also includes a content server 130 which may be configured to provide media content services over a network such as network 125 to communications devices, such as telephone 110 and mobile phone 140. Content server 130 may be in communication with a database, such as content database 135, which may store media content such as ringtones, wallpaper, etc. Further, a server such as content server 130 may be configured to facilitate transfer of data from a network, such as the internet, to a communications device such as telephone 110, or mobile phone 140.

In the exemplary approach, content server 130 is generally in communication with communications server 155, though content server 130 may alternatively be included as software running, for example, on communications server 155 or any other computing device capable of communicating over a network such as communications network 125.

A communications device, such as telephone 110 and mobile phone 140, may be configured to receive an identifier from a user device. An identifier may be provided, for example, through a direct connection, such as a wired connection, or through a wireless communication. By way of example and not of limitation, a user 105 may provide an identifier to a communications device such as phone 110 or mobile phone 140 through a radio frequency identifier (RFID) chip. In an exemplary approach, an RFID chip may be embedded, for example, in a faceplate removably connected to a communications device such as phone 110 or mobile phone 140. Alternatively, an RFID chip may be included, for example, in a card, or a wand which may be placed proximate a communications device. Alternatively, a user 105 may provide an identifier to a communications device by, for example, connecting a Bluetooth headset to the communications device, wherein the identifier may be the associated Bluetooth ID of the headset. In another example, an identifier may be provided to a communications device such as phone 110 or mobile phone 140 by physically connecting a computer chip, a memory chip, etc. with a communications device. Regardless of the method used to provide an identifier to a communications device such as telephone 110 or mobile phone 140, the communications device may include an associated reader to receive the provided identifier.

Radio Frequency Identifier (RFID) chips, or "tags," generally include a memory store capable of storing information. RFID chips further include an antenna for selectively transmitting and receiving information from an RFID reader. Some RFID chips include an integrated circuit capable of modulating and demodulating radio frequency (RF) signals, and processing received information. Generally, RFID chips transmit information in response to a signal received from an RFID reader when the chip is placed in the proximity of a reader. Information stored on RFID chips can be as simple as a few bits of data, though advances in RFID chips allow information stored and/or processed on RFID chips and transmitted to RFID readers to be ever larger and more complex.

Upon receiving an identifier, a communications device such as telephone 110 or mobile phone 140 may, for example, access a data store. A data store may be located within the communications device, or may be located remotely from the communications device, such as on a user device, or on a network, such as network 125. For example, upon receiving an identifier from a user device, a communications device, such as telephone 110 or mobile phone 140 may access an associated user profile 150 to determine, for example, one or more service-based parameters associated with a user 105 or communications device referenced by profile 150. For example, upon receiving a first user identifier, a communications device may charge all subsequent calls and services to a particular user 105 according to billing information stored in the associated profile 150. In another instance, a communications device may alter one or more service parameters defining the behavior or use of the communications device, based on the received identifier. For instance, if a profile 150 associated with a received identifier includes a list of permitted or of prohibited phone numbers, the communications device may thereafter allow calls only to those numbers permitted, or may block all calls to and from those numbers which are prohibited. In another illustrative example, a user profile 150 may indicate, for instance, the number of minutes allotted to an associated user 105, and/or the number of minutes used by the associated user 105. A communications device may thereby limit the amount of time available to an associated user 105.

In further exemplary approach, a communications device such as phone 110 or mobile phone 140 may also alter other parameters, such as the availability of services such as email, text messaging or internet services, the ability to download media content, such as ringtones, wallpaper, etc. over a server such as content server 130, etc. in response to a received identifier.

In addition, a communications device may determine personality-based settings from a profile 150 and adjust at least one internal setting according to information contained with the profile 150. Personality-based settings may include, for example, operational personalization or aesthetic personalization. For instance, a communications device such as telephone 110 or mobile phone 140 may download and/or set a ringtone, or change a wallpaper graphic displayed on a screen of communications device in accordance with personalization data stored in profile 150.

In addition, a communications device may also be configured to determine information desired by a user 105, such as local weather, sports scores, or similar information, and to retrieve the desired information. Desired information may be retrieved, by way of example and not of limitation, over a network such as the internet.

Upon receipt of a subsequent identifier, the communications device may, for example, access a subsequent profile 150 or data store and may thereby access subsequent data, and adjust at least one operational setting. Subsequent data may, but need not, be of a form similar to the data accessed upon receipt of the prior identifier. In this manner, multiple users 105 with unique user devices could, for example, share a common communications device, with each user having individual user experiences and receiving a separate bill for their individual use.

While the above example has been described as including access to content database 135, it is to be understood that this is by way of example and not of limitation, and that mobile communications device 140 could retrieve media content from any appropriate source including, but not limited to, internal memory and the internet. Further, while the above example has been described with reference to mobile communications device 140, it is to be understood that this is by way of example only, and not of limitation, and could also encompass use of communications device 110, or other communications device. In this manner, a mobile communications device 140 may be provided with multiple themes by repeatedly changing user identifiers.

Figure 2A:
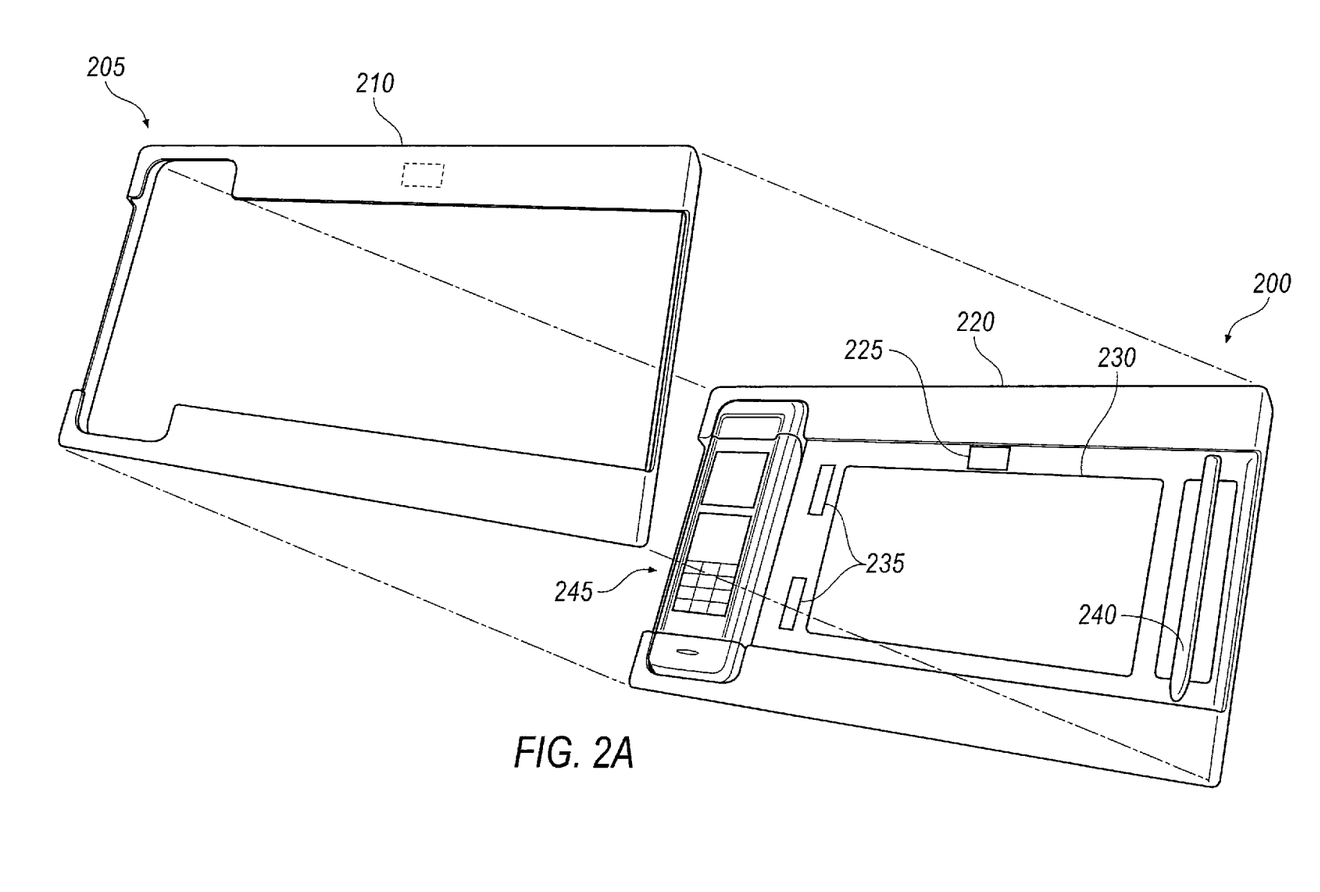
FIG. 2A illustrates a partially exploded view of a communications device including a removable faceplate.

FIG. 2A illustrates a communications device according to one exemplary illustration. The exemplary communications device is a telephone 110. The exemplary telephone 110 may be, for example, an internet phone 200, such as the Verizon® One Phone™, or the Verizon® Hub™ device. Phone 200 is configured to selectively communicate with a user device. In the exemplary approach, telephone 200 includes a base 220 to which a user device is removably connected. The exemplary user device is the illustrated approach is a face plate 205.

Figure 2B:
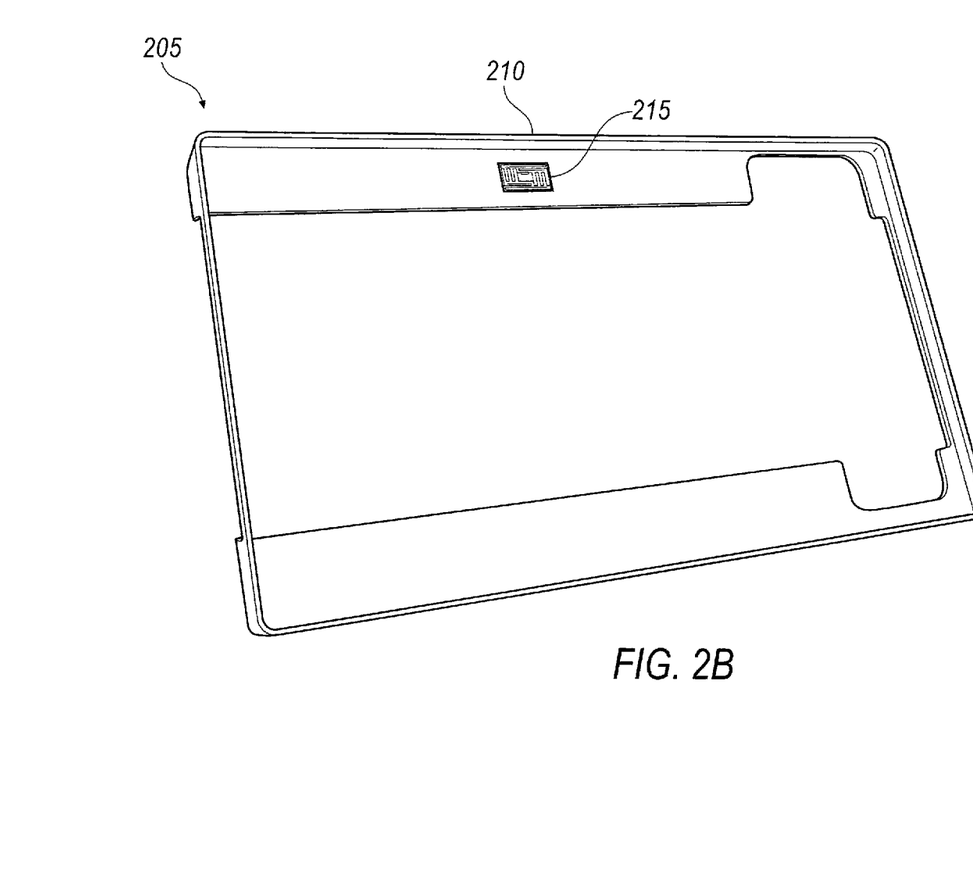
FIG. 2B illustrates a rear view of the faceplate of FIG. 2A.

Faceplate 205 includes a body portion 210 and an RFID chip 215 (FIG. 2B). Base 220 includes an RFID receiver 225 embedded therein. RFID receiver 225 is generally configured to be positioned proximate RFID chip 215 of faceplate 205 when faceplate 205 is attached to base 220. Base 220 may further include a screen 230 configured to display information or media to a user, such as user 105, and may include one or more input mechanisms through which the user 105 can input information into telephone 200. Illustrative mechanisms include, but are not limited to buttons 235 and a stylus 240 for use with a screen 230 compatible for receiving inputs using such a stylus. Additionally, telephone 200 may include a handset 245. Handset 245 may communicate with base 220, such as through a wired or a wireless connection. Telephone 200 may be configured to communicate with a telephone network, such as network 100, a public switch telephone network (PSTN), a wireless telephone network, a fiber network such as the Verizon® FIOS™ network, or other hardware or software device.

FIG. 2B illustrates a rear view of faceplate 205 of FIG. 2A, showing the faceplate body 210 and RFID chip 215. Each RFID chip 215 may include information unique to that RFID chip 215. A phone 200 may use the information stored on the RFID chip 215 to recognize the specific RFID chip 215, faceplate 205, or user 105 that utilizes the faceplate, for example, as explained above.

When a user connects the user device, faceplate 205, to base 220, RFID reader 225 may communicate with RFID chip 215 attached to faceplate body 210. RFID chip 215 may transmit a response to RFID reader 225. The response may include at least an identifier. Telephone 200 may receive the transmitted identifier and may adjust at least one operational setting within the telephone 200, for example, as explained above. By providing individual users 105 with unique user devices 205, each user 105 can have a unique interaction with telephone 200, including unique operational settings. This may be useful, for example, for businesses, dormitories and hotels sharing a phone system. Similarly, parents may be able to provide children with their individual user devices 205 for communications devices, and may thereby control the child's use of the telephone 200.

Figure 3A:
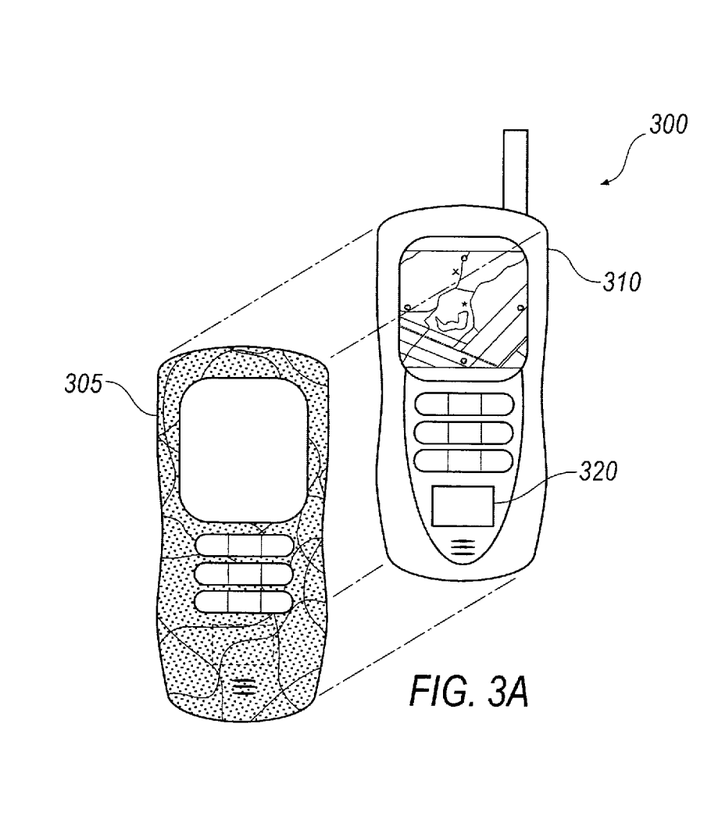
FIG. 3A illustrates a partially exploded view of a mobile communications device including a removable faceplate.
Figure 3B:
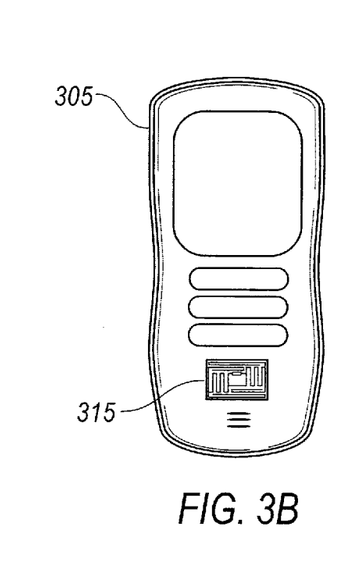
FIG. 3B illustrates a rear view of the faceplate of FIG. 3A.

User identifiers, such as faceplate 205, may be used with a multitude of different types of communications devices, such as a mobile phone 140. FIG. 3A illustrates a partial exploded view of a mobile phone 140 which in this illustrative approach is a cellular phone 300 including a handset 310 with an RFID reader 320 embedded therein. Cellular phone 300 is configured to selectively communicate with a user device. User device in the illustrative approach is again a faceplate 305 having an RFID chip 315. Handset 310 also includes a series of buttons 325 for user input and a screen 330 to display information to a user. FIG. 3B illustrates a rear view of faceplate 305 of FIG. 3A, showing RFID chip 315. While FIGS. 3A and 3B illustrate an RFID chip 315 disposed within a face plate 305, this is by way of example and not of limitation. Other possible technologies may be used in place of an RFID chip, such as explained above. Moreover, other possible locations for a data store such as an RFID chip 205, 305 include, but are not limited to, a battery or battery cover, or held externally to a phone 200, 300 for detection by RFID reader 225, 320.

In the exemplary approach, faceplate 305 may include a graphic displayed thereon, which graphic may be related, for example, to media content which handset 310 may be configured to download upon receipt of an identifier from RFID chip 315. Faceplate 305 may also include textures or contours thereon, which may be complementary to the associated graphic or media content. By swapping one faceplate 305 for another, a user 105 could thus alter the appearance and character of a particular cellular phone 300.

A user could thus purchase multiple user devices, such as faceplates 305, having multiple unique themes. For instance, a hockey fan could first purchase a faceplate 305 having a Detroit Red Wings theme. The faceplate 305 may include a Detroit Red Wings graphic on the outer surface thereof. The faceplate 305 may further include an RFID chip 315 including wallpaper and sounds related to the Detroit Red Wings, or may include an identifier corresponding to such media, for example, on content database 135. When installed on the handset 310, an RFID reader 320 may read RFID chip 315 on faceplate 305 and update the wallpaper to include, for instance, a picture of a Detroit Red Wings player, and may update the ring tone to a song or cheer associated with the Detroit Red Wings. Subsequently, following a heartbreaking playoff loss, the user may then purchase another faceplate 305' having, for instance, a Montreal Canadiens theme. The faceplate 305' may include a Montreal Canadiens graphic on the outer surface thereof and may include an RFID chip 315' including wallpaper and sounds related to the Montreal Canadiens. When the faceplate 305' is installed on handset 310, RFID reader 320 may read RFID chip 315' on faceplate 305' and update the wallpaper to an inspiring picture of a Montreal Canadiens player, and may update the ring tone to "O Canada", or another sound, tune or cheer associated with the Montreal Canadiens.

Figure 4:
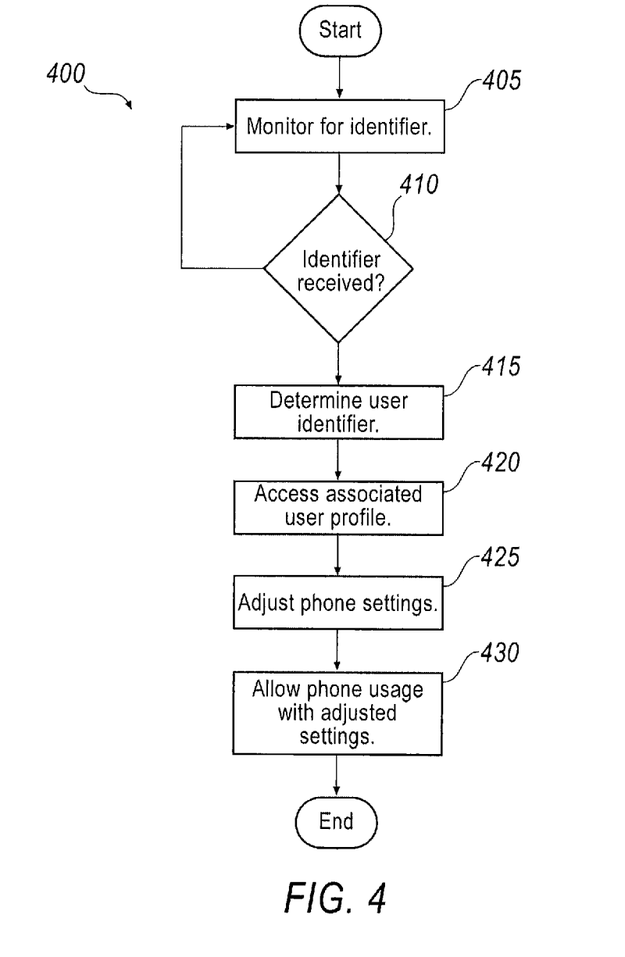
FIG. 4 illustrates an exemplary process for adjusting settings in a communications device based on a received identifier.

FIG. 4 illustrates a method 400 by which a communications device may detect an identifier from a user device and adjust at least one setting in the communications device based thereon. At step 405, communications device monitors for an identifier. Monitoring for an identifier may include, for example, monitoring for an RFID identifier from an RFID chip 215, 315.

At step 410, the communications device determines whether an identifier has been received. If an identifier has not been received, communications device may continue monitoring at step 405. If an identifier has been received, step 415 is performed next.

At step 415, the communications device determines a user identifier associated with the received user identifier. The communications device may determine an associated user identifier by, for example, accessing a memory store. In another exemplary approach, the communications device may determine, for example, a content identifier associated with the received identifier.

At step 420, the communications device accesses a user profile 150 associated with the user identifier determined in step 415. User profile 150 may be located, for example, on a database such as user profile database 145 distinct from the communications device, or within the device itself, as discussed above.

Next, at step 425, the communications device adjusts at least one operational setting within the communications device. For instance, the communications device may cause all usage to be billed in accordance with billing information contained within a user profile 150 associated with the received identifier, or may adjust settings related to available services, may adjust wallpapers or ring tones, etc.

Finally, at step 430, the communications device allows usage of the communications device with the settings adjusted as per step 425. The communications device may then continue monitoring for subsequent identifiers and adjust settings accordingly.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems, and should in no way be construed so as to limit the claimed invention.

Accordingly, it is to be understood that the above description is intended to be illustrative and not restrictive. Many systems and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future systems. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites explicitly to the contrary.

What is claimed is:

1. A device comprising:
    a communications device configured to receive an input from a user device when the communications device is positioned proximate the user device, the user device having a data store including at least an identifier,
    wherein the communications device is configured to determine whether the user device is in proximity to the communications device, and if so:
        transmit an indication to the user device that the user device is in proximity to the communications device;
        receive the identifier transmitted to the communications device from the user device in response to the user device receiving the indication from the communications device; and
        adjust at least one operational setting within the communications device in response to receiving the identifier from the user device.

2. The device of claim 1, wherein the communications device is configured to receive an identifier over a wireless connection.

3. The device of claim 2, wherein the communications device is configured to receive an identifier over a wireless connection from an unpowered user device.

4. The device of claim 3, wherein the user device includes an RFID chip configured to receive the indication that the user device is in proximity to the communications device.

5. The device of claim 2, wherein the communications device is configured to receive an identifier over an infrared connection.

6. The device of claim 1, wherein the communications device is configured to receive an identifier over a wired connection.

7. The device of claim 1, wherein the communications device is configured to access a user profile associated with the received identifier.

8. The device of claim 7, wherein the communications device is configured to adjust at least one setting according to settings included in the accessed user profile.

9. The device of claim 1, wherein the received identifier corresponds to a user.

10. The device of claim 1, wherein the at least one operational setting includes at least one service-based setting, which service-based setting includes at least one of minutes available to a user, phone numbers with which a user is able to communicate, phone numbers with which a user is prohibited from communicating, and particular times during which a user may use communication services.

11. The device of claim 1, wherein the at least one operational setting includes at least one of a ring tone and a wallpaper graphic.

12. The device of claim 1, wherein the user device is a faceplate removably connected to the communications device and is configured to receive the indication that the faceplate is in proximity to the communications device.

13. The device of claim 1, wherein the user device includes at least one of an exterior graphic, texture or contour complementary to the at least one operational setting.

14. A method of providing communications services through a communications device, the method comprising:
  determining, by the communications device, whether a user device is disposed on the communications device, wherein the user device includes a chip configured to wirelessly communicate with the communications device;
  transmitting an indication to the user device that the user device is disposed on the communications device;
  receiving at least an identifier from the user device when the communications device is disposed on the user device, and
  adjusting at least one operational setting within the communications device based at least in part on the at least one identifier received.

15. The method of claim 14, wherein receiving at least an identifier includes receiving an identifier over a wireless connection.

16. The method of claim 15, wherein receiving an identifier over a wireless connection includes receiving an identifier from an unpowered user device.

17. The method of claim 15, wherein receiving at least an identifier over a wireless connection includes receiving at least an identifier over an RFID connection.

18. The method of claim 14, further comprising accessing a user profile associated with a received identifier.

19. The method of claim 14, wherein adjusting at least one operational setting includes adjusting at least one setting according to settings included in the accessed user profile.

20. The method of claim 14, wherein the received identifier corresponds to a user.

21. The method of claim 14, wherein adjusting at least one operational setting includes adjusting at least one service-based setting, which service-based setting includes at least one of minutes available to a user, phone numbers with which a user is able to communicate, phone numbers with which a user is prohibited from communicating, and particular times during which a user may use communication services.

22. The method of claim 14, wherein adjusting at least one operational setting includes adjusting at least one of a ring tone and a wallpaper graphic.

23. The method of claim 14, using a faceplate as the user device and further comprising:
  removably connecting the faceplate to the communications device; and
  receiving, at the faceplate, the indication that the user device is disposed on the communications device.

24. The method of claim 14, the user device including at least one of an exterior graphic, texture or contour complementary to the at least one operational setting.

25. A system comprising:
  a user device having a data store including at least an identifier and wherein the user device includes a chip configured to wirelessly transmit the identifier to a communications device in response to receiving an indication from the communications device that the user device is disposed on the communications device,
  wherein the communications device is configured to determine whether the user device is disposed on the communications device, and if so, transmit the indication to the user device, receive the identifier from the user device, and adjust at least one operational setting within the communications device upon receiving the identifier.

* * * * *